United States Patent
Moghadam et al.

(10) Patent No.: US 11,620,568 B2
(45) Date of Patent: Apr. 4, 2023

(54) USING HYPERPARAMETER PREDICTORS TO IMPROVE ACCURACY OF AUTOMATIC MACHINE LEARNING MODEL SELECTION

(71) Applicant: Oracle International Corporation, Redwood Shores, CA (US)

(72) Inventors: Hesam Fathi Moghadam, Sunnyvale, CA (US); Sandeep Agrawal, San Jose, CA (US); Venkatanathan Varadarajan, Austin, TX (US); Anatoly Yakovlev, Hayward, CA (US); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 977 days.

(21) Appl. No.: 16/388,830

(22) Filed: Apr. 18, 2019

(65) Prior Publication Data

US 2020/0334569 A1    Oct. 22, 2020

(51) Int. Cl.
*G06N 20/00* (2019.01)
*G06N 20/10* (2019.01)
(Continued)

(52) U.S. Cl.
CPC .............. *G06N 20/00* (2019.01); *G06N 3/08* (2013.01); *G06N 20/10* (2019.01); *G06N 20/20* (2019.01)

(58) Field of Classification Search
CPC ........ G06N 20/00; G06N 20/10; G06N 20/20; G06N 3/08; G06N 5/00; G06N 5/02;
(Continued)

(56) References Cited

U.S. PATENT DOCUMENTS 11,392,859 B2    7/2022 Basu et al.
2002/0169735 A1   11/2002 Kil et al.
(Continued)

FOREIGN PATENT DOCUMENTS

EP         3 101 599 A2    12/2016
WO    WO 2008/133509 A1    11/2008

OTHER PUBLICATIONS

Wistuba et al. "Scalable Gaussian process-based transfer surrogates for hyperparameter optimization" 2017 https://link.springer.com/article/10.1007/s10994-017-5684-y (Year: 2017).*

(Continued)

*Primary Examiner* — Kamran Afshar
*Assistant Examiner* — Shoun J Abraham
(74) *Attorney, Agent, or Firm* — Hickman Becker Bingham Ledesma LLP

(57) ABSTRACT

Techniques are provided for selection of machine learning algorithms based on performance predictions by using hyperparameter predictors. In an embodiment, for each mini-machine learning model (MML model), a respective hyperparameter predictor set that predicts a respective set of hyperparameter settings for a data set is trained. Each MML model represents a respective reference machine learning model (RML model). Data set samples are generated from the data set. Meta-feature sets are generated, each meta-feature set describing a respective data set sample. A respective target set of hyperparameter settings are generated for said each MML model using a hypertuning algorithm. The meta-feature sets and the respective target set of hyperparameter settings are used to train the respective hyperparameter predictor set. Each hyperparameter predictor set is used during training and inference to improve the accuracy of automatically selecting a RML model per data set.

20 Claims, 6 Drawing Sheets

(51) Int. Cl.
   *G06N 20/20* (2019.01)
   *G06N 3/08* (2023.01)
(58) Field of Classification Search
   CPC ............ G06N 5/04; G06N 7/00; G06N 7/005; G06N 7/01
   See application file for complete search history.

(56) References Cited

U.S. PATENT DOCUMENTS

| | | |
|---|---|---|
| 2014/0188768 A1 | 7/2014 | Bonissone et al. |
| 2014/0344193 A1 | 11/2014 | Bilenko et al. |
| 2016/0358099 A1 | 12/2016 | Sturlaugson et al. |
| 2017/0061329 A1 | 3/2017 | Kobayashi |
| 2018/0022539 A1 | 1/2018 | Vedani |
| 2018/0046926 A1 | 2/2018 | Achin |
| 2018/0225391 A1 | 8/2018 | Sali et al. |
| 2019/0042887 A1 | 2/2019 | Nguyen |
| 2019/0095756 A1 | 3/2019 | Agrawal |
| 2019/0095785 A1 | 3/2019 | Sarkar et al. |
| 2019/0095818 A1 | 3/2019 | Varadarajan |
| 2019/0095819 A1 | 3/2019 | Varadarajan |
| 2019/0377610 A1 | 12/2019 | Gupta et al. |
| 2019/0392255 A1 | 12/2019 | Franklin |
| 2020/0034197 A1 | 1/2020 | Nagpal et al. |
| 2020/0082013 A1 | 3/2020 | Triplet et al. |
| 2020/0089917 A1 | 3/2020 | Skourtis et al. |
| 2020/0125961 A1 | 4/2020 | Agrawal |
| 2020/0327448 A1 | 10/2020 | Yakovlev |
| 2020/0380378 A1 | 12/2020 | Moharrer |
| 2021/0390466 A1 | 12/2021 | Varadarajan et al. |
| 2022/0121955 A1 | 4/2022 | Chavoshi et al. |

OTHER PUBLICATIONS

Wistuba et al. "Learning hyperparameter optimization initializations" 2015 https://ieeexplore.ieee.org/abstract/document/7344817 (Year: 2015).*
Cohen et al. "Online Row Sampling", 2016 https://arxiv.org/pdf/1604.05448.pdf (Year: 2016).*
Feurer et al. "Scalable Meta-Learning for Bayesian Optimization", 2018 https://www.researchgate.net/profile/Matthias-Feurer/publication/323003916_Scalable_Meta-Learning_for_Bayesian_Optimization/links/5f7c3349a6fdccfd7b4a87d9/Scalable-Meta-Learning-for-Bayesian-Optimization.pdf (Year: 2018).*
Bardenet et al. "Collaborative hyperparameter tuning", 2013 http://proceedings.mlr.press/v28/bardenet13.pdf (Year: 2013).*
Yogatama et al. "Efficient Transfer Learning Method for Automatic Hyperparameter Tuning" 2014 http://proceedings.mlr.press/v33/yogatama14.pdf (Year: 2014).*
Malkomes et al. "Bayesian optimization for automated model selection", 2016 https://proceedings.neurips.cc/paper/2016/file/3bbfdde8842a5c44a0323518eec97cbe-Paper.pdf (Year: 2016).*
Yakovlev, U.S. Appl. No. 16/384,588, filed Apr. 15, 2019, Final Rejection dated Jan. 18, 2022.
Yakovlev, U.S. Appl. No. 16/384,588, filed Apr. 15, 2019, Non-Final Rejection dated Sep. 16, 2021.
Varadarajan, U.S. Appl. No. 16/137,719, filed Sep. 21, 2018, Notice of Allowance dated Aug. 4, 2021.
Varadarajan, U.S. Appl. No. 16/137,719, filed Sep. 21, 2018, Notice of Allowance dated Jul. 9, 2021.
Varadarajan, U.S. Appl. No. 16/137,719, filed Sep. 21, 2018, Interview Summary dated Jul. 9, 2021.
Varadarajan, U.S. Appl. No. 15/885,515, filed Jan. 31, 2018, Office Action dated Jun. 17, 2021.
Varadarajan, U.S. Appl. No. 15/885,515, filed Jan. 31, 2018, Notice of Allowance dated Aug. 4, 2021.
Varadarajan, U.S. Appl. No. 15/885,515, filed Jan. 31, 2018, Notice of Allowance dated Jul. 26, 2021.
Agrawal, U.S. Appl. No. 16/166,039, filed Oct. 19, 2018, Non-Final Rejection dated Sep. 3, 2021.
Lin et al., "Experiencing SAX: a novel symbolic representation of time series", dated Apr. 3, 2007, 38 pages.
Abe et al., "Developing an Integrated Time-Series Data Mining Environment for Medical Data Mining", Seventh IEEE International Conference on Data Mining—Workshops, dated 2007, 6 pages.
Ahmed et al., "An Empirical Comparison of Machine Learning Models for Time Series Forecasting", dated Sep. 15, 2010, 31 pages.
Amazon SageMaker, "DeepAR Forecasting Algorithm", https://docs.aws.amazon.com/sagemaker/latest/dg/deepar.html,last viewed on Jun. 29, 2020, 5 pages.
Artificial Intelligence Blog, "Announcing automated ML capability in Azure Machine Learning", dated Sep. 24, 2018, 8 pages.
Brownlee, Jason, "Time Series Forecasting as Supervised Learning", dated Aug. 21, 2019, 2 pages.
Camerra et al., "Beyond one billion time series: indexing and mining very large time series collections with iSAX2+", dated Feb. 16, 2013, 29 pages.
"Machine Learning Approaches for Time Series Data" dated May 19, 2019, 25 pages.
Kraska, Tim, "Northstar: An Interactive Data Science System", Proceedings of the VLDB Endowment, vol. 11, No. 12 Copyright 2018 VLDB Endowment, 15 pages.
Wang et al., "Experimental comparison of representation methods and distance measures for time series data", dated Feb. 12, 2010, 35 pages.
Ng, "Data preprocessing for machine learning: options and recommendations", dated Jun. 22, 2020, 12 pages.
Olson et al., "Evaluation of a Tree-based Pipeline Optimization Tool for Automating Data Science", dated Mar. 20, 2016, 8 pages.
Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.
Paoli et al., "Forecasting of preprocessed daily solar radiation time series using neural networks", Solar Energy, Elsevier, dated 2010, 43 pages.
Plotz et al., "Feature Learning for Activity Recognition in Ubiquitous Computing", dated Jan. 2011, 7 pages.
Schoenfeld et al., "Preprocessor Selection for Machine Learning Pipelines", dated 2018, 7 pages.
Song et al., "Deep r-th Root of Rank Supervised Joint Binary Embedding for Multivariate Time Series Retrieval", KDD 2018, dated Aug. 19-23, 2018, London, United Kingdom, 10 pages.
Faloutsos et al., "Fast Subsequence Matching in Time Series Databases", dated 1998, 11 pages.
Marculescu et al., "Hardware-Aware Machine Learning: Modeling and Optimization", Arxiv.org, dated Sep. 14, 2018, 8 pages.
Koehrsen, Will, "Automated Machine Learning Hyperparameter Tuning in Python", dated Jul. 3, 2018, 21 pages.
Yogatama et al., "E cient Transfer Learning Method for Automatic Hyperparameter Tuning", Proceedings of the 17th International Conference on Artifical Intelligence and Statistics dated 2014, 9 pages.
Swersky et al., "Multi-Task Bayesian Optimization", dated 2013, 9 pages.
Kim et al., "Learning to Transfer Initializations for Bayesian Hyperparameter Optimization", 31st Conference on Neural Information Processing Systems dated 2017, Long Beach, CA, USA, 5 pages.
Feurer et al., "Using Meta-Learning to Initialize Bayesian Optimization of Hyperparameters", dated 2014, 8 pages.
Feurer et al., "Initializing Bayesian Hyperparameter Optimization via Meta-Learning", dated 2015, 8 pages.
Bardenet et al., "Collaborative hyperparameter tuning", Proceedings of the 30 th International Conference on Machine Learning, Atlanta, Georgia, USA, 2013, 9 pages.
Brazdil et al., "Ranking Learning Algorithms: Using IBL and Meta-Learning on Accuracy and Time Results", dated 2003 Kluwer Academic Publishers. Manufactured in The Netherlands, 27 pages.
Filchenkjov et al., "Datasets Meta-Feature Description for Recommending Feature Selection Algorithm", dated Nov. 2015, 9 pages.

(56) References Cited

OTHER PUBLICATIONS

Feurer et al., "Initializing Bayesian Hyperparameter Optimization via Meta-Learning", Proceedings of the Twenty-Ninth AAAI Conference on Artificial Intelligence dated 2015, 8 pages.
Feurer et al. "Efficient and Robust Automated Machine Learning", dated 2015, 9 pages.
Doan et al., "Selecting Machine Learning Algorithms using Regression Models", https://www.researchgate.net/publication/304298580, dated Nov. 2015, 8 pages.
Doan et al., "Algorithm Selection Using Performance and Run Time Behavior", Chapter, Artificial Intelligence: Methodology, Systems and Applicationsm AIMSA dated Sep. 2016, pp. 3-13.
Chen Chi-Ou et al., "Machine Learning-Based Configuration Parameter Tuning on Hadoop System", dated Jun. 27, 2015, IEEE, pp. 386-392.
Castiello et al., "Meta-data: Characterization of Input Features for Meta-learning", Springer-Verlag Berlin Heidelberg dated 2005, 13 pages.
Aldave et al., "Systematic Ensemble Learning fro Regression" dated Mar. 28, 2014, pp. 1-38.
Brazdil, Pavel, "Metalearning and Algorithm Selection: Progress, State of the Art and Introduction of the 2018 Special Issue", dated Dec. 2017, 23 pages.
Gonzalez et al., "Batch Bayesian Optimization via Local Penalization", Proceedings of the 19th International Conference on Artificial Intelligence and Statistics, dated 2016, 10 pages.
Bergstra et al., "Random Search for Hyper-Parameter Optimization", Journal of Machine Learning Research 13 (2012) 281-305, dated Feb. 2012, 25 pages.
Bergstra et al., "Making a Science of Model Search: Hyperparameter Optimization in Hundreds of Dimensions for Vision Architectures", JMLR: W &CP, vol. 28, dated 2013, 9 pages.
Bergstra et al., "Hyperparameter Optimization and Boosting for Classifying Facial Expressions: How good can a "Null" Model be?", ICML Workshop on Representation and Learning, dated 2013, 7 pages.
Bergstra et al., "Hyperopt: A Python Library for Optimizing the Hyperparameters of Machine Learning Algorithms", Proc. of the 12th Python in Science Conf. (SCIPY 2013), dated 2013, 8 pages.
Bensusan et al., "Discovering Task Neighbourhoods through Landmark Learning Performances", Springer-Verlag Berlin Heidelberg dated 2000, 6 pages.
Bensusan et al., "Casa Batlo is in Passeig de Gracia or how landmark performances can describe tasks", dated 2000, 19 pages.
Andrychowicz et al., "Learning to learn by gradient descent by gradient descent", 30th Conference on Neural Information Processing Systems dated (NIPS 2016), Barcelona, Spain, 9 pages.
Caruana et al., "Ensemble Selection From Libraries of Models", Proceedings, Twenty-First International Conference on Machine Learning: dated Jul. 2004, 8 pages.
Nelder et al., "A Simplex Method for Function Minimization", The Computer Journal, vol. 7, dated Apr. 1, 1964, pp. 308-313.
Snoek, "Practical Bayesian Optimization of Machine Learning Algorithms", dated 2012, 9 pages.
Snoek et al., "Scalable Bayesian Optimization Using Deep Neural Networks", dated 2014, 10 pages.
Snoek et al., "Input Warping for Bayesian Optimization of Non-Stationary Functions", Proceedings of the 31 st International Conference on Machine Learning, Beijing, China, 2014, 9 pages.
Simpson et al., "Automatic Algorithm Selection in Computational Software Using Machine Learning", dated 2016, 10 pages.
Scikit Learn, "3.2. Tuning the hyper-parameters of an estimator", http://scikitlearn.org/stable/modules/grid_search.html, dated 2017, 6 pages.
Reif et al., "Prediction of Classifier Training Time including Parameter Optimization", dated Oct. 2011, 13 pages.
Pinter, Janos, "Calibrating Artificial Neural Networks by Global Optimization", Technical Report, Özyeğin University, Istanbul Submitted for publication: Jul. 2010, 17 pages.

Furnkranz et al., "An Evaluation of Landmarking Variants", dated 2001, 12 pages.
Pešková et al., "Hybrid Multi-Agent System for Metalearning in Data Mining", dated Sep. 19, 2014, 2 pages.
Gonnet et al., Automatic Problem-Specific Hyperparameter Optimization and Model Selection for Supervised Machine Learning, Technical Report, dated Jan. 1, 2015, 54 pages.
Mendes-Moreira et al., "Ensemble Approaches for Regression", ACM Computing Surveys, ACM, New York, NY vol. 45, No. 1, dated Dec. 7, 2012, pp. 1-40.
Lindne et al., "AST: Support for Algorithm Selection with a CBR Approach", Springer-Verlag Berlin Heidelberg 1999, 6 pages.
Lim et al., "A Comparison of Prediction Accuracy, Complexity, and Training Time of Thirty-Three Old and New Classification Algorithms", dated 2000, 26 pages.
Lemke et al., "Metalearning: a survey of trends and technologies", Artif Intell Rev dated 2015,14 pages.
Kuck et al., "Meta-learning with neural networks and landmarking for forecasting model selection an empirical evaluation of different feature sets applied to industry data", dated Jul. 24-29, 2016, 8pgs.
J.D Wichard, "Model Selection in an Ensemble Framework", The 2013 International Joint Conference on Neural Networks, dated Jan. 1, 2006, pp. 2187-2192.
Hutter et al., "Sequential Model-Based Optimization for General Algorithm Configuration", dated 2011, 15 pages.
Weinberger et al., "Unsupervised learning of image manifolds by semidefinite programming", IEEE, dated Jun. 27, 2004, 10 pages.
Pedregosa, Fabian, "Hyperparameter Optimization with Approximate Gradient", Proceedings of the 33rd International Conference on Machinelearning, New York, vol. 48, dated Jun. 26, 2016, pp. 1-15.
Xin, Guo "A New Approach Towards the Combined Algorithm Selection and Hyper-parameter Optimization Problem", dated Jan. 28, 2019, 57 pages.
Thornton et al., "Auto-WEKA: Combined Selection and Hyperparameter Optimization of Classification Algorithms", New York, New York, dated Mar. 6, 2013, 9 pages.
Jomaa et al., "Dataset2Vec: Learning Dataset Meta-Features", dated May 5, 2019, 20 pages.
Zhen Hua Liu et al. "JSON Data Management in RDBMS", Emerging Technologies and Applications in Data Processing and Management, dated May 13, 2019, pp. 20-45.
Knut Anders Hatlen, "Partial Update of JSON Values", MySQL Server Blog, dated Apr. 3, 2018, 6 pages.
Bryan P et al., "JavaScript Object Notation (JSON) Patch; rfc6902.txt", Javascript Object Notation (JSON) Patch, Internet Engineering Task Force, Standard, Internet Society, Apr. 3, 2013, 18 pages.
Sedghi et al., "Provable Methods for Training Neural Networks with Sparse Connectivity", 2015, 10 pages.
Merkwirth et al., "A Short Introduction to ENTOOL", Jan. 14, 2003, 11 pages.
Kwak et al., "Statistical data preparation: management of missing values and outliers", Korean Journal of Anesthesiology, vol. 70, No. 4, 2017, 5 pages.
Heinermann et al., "Machine learning ensembles for wind power prediction", Renewable Energy, 89, 2016, 9 pages.
Haixiang et al., "Learning from class-imbalanced data: Review of methods and applications", Expert Systems with Applications, 73, 2016, 20 pages.
Chauhan, "Categorical Encoding, One Hot Encoding and why use it?", Everything Artificial Intelligence, available: https://aichamp.wordpress.com/2017/02/24/categorical-encoding-one-hot-encoding-and-why-use-it/, Feb. 24, 2017, 5 pages.
"n-Tuple", Wolfram MathWorld, available: https://mathworld.wolfram.com/n-Tuple.html, 2015, 1 page.
Zhang et al., "Privacy-Preserving Machine Learning through Data Obfuscation", Jul. 2018, 12 pages.
Raschka, "Machine Learning FAQ: What Is The Difference Between Pearson Rand Simple Linear Regression?", https://web.archive.org/web/20160402054319/http://sebastianraschka.com:80/faq/docs/pearson-r-vs-linear-regr.html, dated Apr. 2, 2016, 4 pages.

(56) References Cited

OTHER PUBLICATIONS

Hutter et al., Algorithm Runtime Prediction: Methods & Evaluation, Artificial Intelligence 206, Oct. 2013, 33 pages.

Hsu et al., "A Practical Guide to Support Vector Classification", May 19, 2016, National Taiwan University, 2016, pp. 1-16.

Brochu et al., "A Tutorial on Bayesian Optimization of Expensive Cost Functions, with Application to Active User Modeling and Hierarchical Reinforcement Learning", Dec. 14, 2010, pp. 1-49.

Bhide, Manish, "Understanding Model Drift with IBM Watson OpenScale", Medium, Trusted AI, available: https://medium.com/trusted-ai/understanding-model-drift-with-IBM-watson-openscale-4c5401aa8da4, 2019.

Giraud-Carrier, "The Data Mining Advisor: Meta-learning at the Service of Practitioners", Fourth International Conference on Machine Learning and Applications (ICMLA'05), IEEE, 2005, 7 pages.

Wistuba, M. et al., "Learning Hyperparameter Optimization Initializations", 2015 IEEE Intnl Conf. on Data Science and Advanced Analytics (DSAA), Paris, France, pp. 1-10, Oct. 19, 2015, 10 pages.

Maher, M., et al., "SmartML: A Meta Learning-Based Framework for Automated Selection and Hyperparameter Tuning for Machine Learning Algorithms", Mar. 2019, 22nd Intnl. Conf. on Extending Database Tech., Lisbon, Portugal, pp. 554-557, Mar. 2019, 5 pgs.

\* cited by examiner

USING HYPERPARAMETER PREDICTORS TO IMPROVE ACCURACY OF AUTOMATIC MACHINE LEARNING MODEL SELECTION

FIELD OF THE DISCLOSURE

This disclosure relates to machine meta-learning. Presented herein are techniques for optimal selection of machine learning algorithms based on performance predictions by trained algorithm-specific regressors, and techniques for training the regressors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning is used in a variety of applications and domains such as healthcare, Internet of Things (IOT), finance, and security. Decades of research have created a huge assortment of algorithms and techniques that can be applied to these applications. Selecting the best algorithm for an application may be difficult and resource intensive. For example, a classification task can be done by several algorithms such as support vector machines (SVMs), random forests, decision trees, artificial neural networks, and more. Each of these algorithms has many variations and configurations and performs differently for different datasets. Choosing the best algorithm is typically a manual task performed by a data scientist or a machine learning expert having years of experience.

Some automatic algorithm selection techniques incur significant computational overhead, such as during product research and development (R&D), which can prolong a time to market. There are hundreds of machine learning algorithms. Training and testing each one to find the best performing might not be feasible. Automatic approaches to selective training typically ultimately use a single regressor/classifier for predicting algorithm performance, which causes different algorithms to interfere with each other in the selection model, thereby lowering accuracy. These approaches also do not consider algorithm hyperparameters, which can significantly affect algorithm performance and behavior.

DETAILED DESCRIPTION

Figure 1:
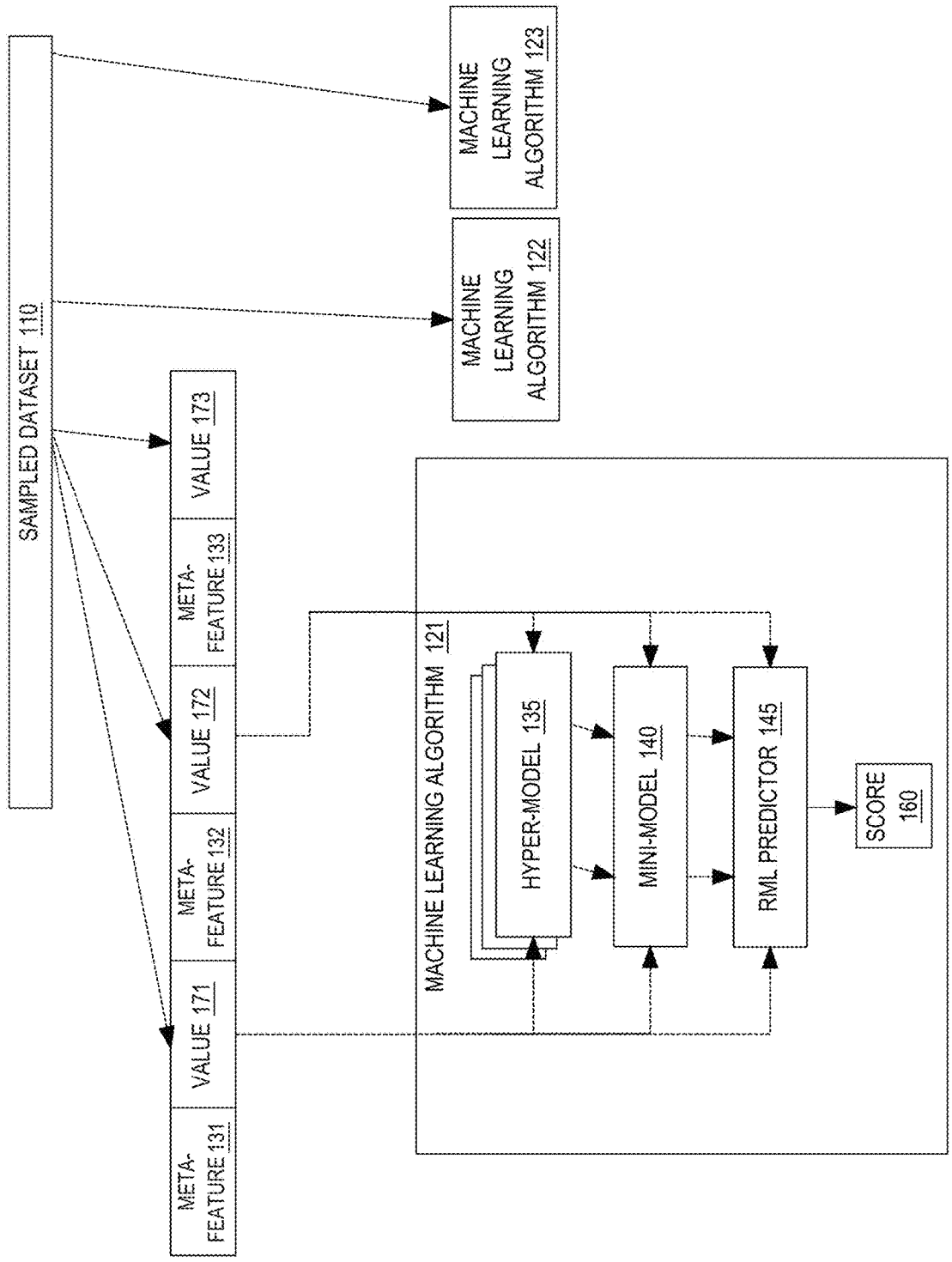
FIG. 1 is a block diagram that depicts an example computer that optimally selects trainable algorithms based on performance predictions by using hyperparameter predictors, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for selection of machine learning algorithms based on performance predictions by trained algorithm-specific regressors using hyperparameter predictors.

A two-level approach is utilized to train an automatic model selection model that uses trained mini-models and data set meta-features ("meta-features") about a data set to select a optimal machine model for the dataset. A mini-model is a smaller version of a reference model (RML), i.e. the full model, and requires less computational resources to train. The trained mini-models use hyper-parameters predicted by hyperparameter predictors based on meta-features of the data set. The hyperparameter predictors are machine learning models referred to herein as hyperparameter predictors.

In a first level of training, hyperparameter predictors are trained for each mini-model. Specifically, for a given mini-model and for each hypermeter of the given model, a hyperparameter predictor is trained to predicate an optimal hyperparameter setting, using as training input meta-features of a data set sample and as a target an optimal hyperparameter settings predicted for the data set by a hypertuning algorithm (AHT algorithm) for the data set samples. The AHT algorithm is described in related U.S. patent application Ser. No. 15/884,163, entitled "Algorithm-Specific Neural Network Architectures for Automatic Machine Learning Model Selection", and filed Jan. 30, 2018, the entire contents of which is hereby incorporated by reference as if fully set for herein. Mini-models are described in related U.S. patent application Ser. No. 16/166,039, entitled "Mini-Machine Learning", and filed Oct. 19, 2018, the entire contents of which is hereby incorporated by reference as if fully set for herein.

In the second level of training, for each RML, a RML predictor is trained. Importantly, the RML predictor is trained using a mini-model having optimal hyperparameter settings predicted by the hyperparameter predictor of the mini-model. Specifically, the training inputs include meta-features generated for data set samples and scores generated by training the mini-model on samples using the optimal hyperparameter settings. The target is the scores generated by the AHT algorithm for full data set Using predicted hyperparameters for a mini-model improves the accuracy of scores of each mini-model such that the score of a mini-model using predicted hyperparameters much more closely resembles the reference model score per dataset. The use of mini-models and improved scores are used to more efficiently and accurately rank and select the best algorithm for the given dataset.

Example Computer

FIG. 1 is a block diagram that depicts an example computer 100, in an embodiment. Computer 100 optimally selects machine learning algorithms based on performance predictions by using hyperparameter predictors. Computer 100 may be one or more computers such as an embedded computer, a personal computer, a rack server such as a blade, a mainframe, a virtual machine, or any computing device that uses scratch memory during numeric and symbolic processing.

Machine Learning Algorithms

Computer 100 contains or accesses specifications of multiple distinct trainable machine learning algorithms, such as 121-123, each of which may perform analysis such as classification, regression, clustering, or anomaly detection. As referred to herein, training a machine learning algorithm is defined as training a model having a particular machine learning algorithm. For example, machine learning algorithm 121 may be a support vector machine (SVM) or an artificial neural network (ANN), and machine learning algorithm 122 may be a decision tree or a random forest.

Each of machine learning algorithms 121-123 is trainable and perhaps due for tuning (retraining) or not yet trained. Each of machine learning algorithms 121-123 may or may not be ready (trained) for immediate use on sampled dataset 110. Sampled dataset 110 may be associated with a dataset, which may be empirical data, either exhaustive or representative, that each machine learning algorithm 121-123 may eventually use for training or inference such as data mining.

Training a machine learning algorithm 121-123 is computationally very expensive, which may be aggravated by the amount of raw data in sampled dataset 110. Computational feasibility may require that computer 100 (or another computer) train only one or a small subset of machine learning algorithms 121-123.

Ideally, computer 100 would select (for training and/or inference) a few of machine learning algorithms 121-123 that could produce the best (most accurate, least error) results with sampled dataset 110. However, because some or all of machine learning algorithms 121-123 may still need training or retraining, accuracy prediction for machine learning algorithms 121-123 may be difficult or impossible.

Accuracy prediction may be further aggravated by the amount of available machine learning algorithms such as 121-123. Machine learning has hundreds of machine learning algorithms and is still rapidly growing.

Meta-Features

Features of a dataset itself as a whole are referred to as meta-features. For example, sampled dataset 110 has meta-features 131-133.

Meta-feature values 171-173 may characterize sampled dataset 110, such that somewhat similar datasets should have somewhat similar meta-feature values. Likewise, different configuration alternatives of machine learning algorithm 121 may be more suited or less suited for analyzing different categories of datasets.

For example, if sampled dataset 110 is a collection of photographs, then meta-feature 131 may be a count of photographs or an arithmetic mean of pixels per photo, and meta-feature 132 may be a statistical variance of all pixel luminosities of all of the photos or median count of edges of all photos, which may be somewhat rigorous to calculate.

Unlike hyperparameters that may have many values, each meta-feature has at most one value. For example, meta-feature 131 has value 171.

Some meta-features may be applicable to some but not all datasets. For example, some meta-features may naturally lack values for sampled dataset 110. For example, a meta-feature for a statistically modal haircut style may lack a value if none of the photographs of dataset 110 contain people.

Hyperparameter Predictors

Features of a machine learning algorithm are referred to as hyperparameters. If machine learning algorithm 121 is a support vector machine, then hyperparameters typically include C and gamma. If machine learning algorithm 121 is a neural network, then hyperparameters may include features such as a count of layers and/or a count of neurons per layer.

Computer 100 creates or obtains hyperparameter predictors 135 for each of machine learning algorithms 121-123 to predict and produce optimal mini-model hyperparameters. The mini-model hyperparameters are optimal because they are tuned and produced by the system per mini-model to improve the accuracy of mini-model scores over previous techniques of using static or standard hyperparameters.

Training of hyperparameter predictors 135 and the production of mini-model hyperparameters is discussed later herein.

Mini-Models

Computer 100 creates or obtains mini-models for each of machine learning algorithms 121-123 to quickly and accurately predict the performance of each machine learning algorithm. A mini-model 140 is a smaller version of a larger machine learning model, referred to as a RML, that is defined by two primary characteristics in relationship with their RML model, that is, a mini-model 140 requires significantly less time to train and is predictive of the RML model's score (i.e., mini-model scores can be used as features to predict the score of the RML model). These two characteristics make mini-models extremely powerful as drop-in replacements for full reference models in a variety of use cases.

A mini-model 140 closely tracks the RML model's score within some error bound (c), allowing a user to judge the relative performance of the RML model on a given dataset by simply using a mini-model in place of a corresponding RML model.

RML Predictors

Computer 100 creates or obtains RML predictors for each of machine learning algorithms 121-123 to quickly and accurately predict the performance of each machine learning algorithm. For example, computer 100 may create RML predictor 145 as a performance predictor of machine learning algorithm 121. In an embodiment, computer 100 may create a plurality of RML predictors as performance predictors of machine learning algorithm 121.

RML predictor 145 is itself an instance of trainable regression algorithm, although not the same machine learning algorithm for which the RML predictors are trained for. For example, RML predictor 145 may be a distinct neural network that is already trained to predict the performance of machine learning algorithm 121, which may be a support vector machine instead of a neural network. Training of RML predictors is discussed later herein.

In operation, computer 100 obtains dataset 110 and should use RML predictor 145 to select a more or less optimal subset of machine learning algorithms 121-123 to eventually be tuned with sampled dataset 110 or an unsampled dataset. When predicting performance of a machine learning algorithm, a RML predictor should consider features of the machine learning algorithm and features sampled dataset 110 or an unsampled dataset.

Scores

RML predictor 145 may be an already trained regressor that processes inputs to emit a comparative suitability score. For example, RML predictor 145 emits score 160.

Score 160 shares a performance measurement scale. For example, a score may predictively measure how proficient (accuracy such as error rate) would a particular configuration of a particular machine learning algorithm become after training for a fixed duration with a particular training dataset, for which sampled dataset 110 is representative (e.g. small sample) of the training dataset.

Likewise, a score may instead predictively measure how much time does a particular configuration of a particular machine learning algorithm need to achieve a fixed proficiency for a particular training data set. Instead, a score may simply be a comparative measure of abstract suitability of a particular machine learning algorithm for a particular dataset.

Regardless of score semantics, each RML predictor of each machine learning algorithm emits a score. Computer 100 may rank each machine learning algorithm based on an emitted score of RML predictor and select the best ranked machine learning algorithm as an optimal candidate for the input dataset.

Training

Figure 2:
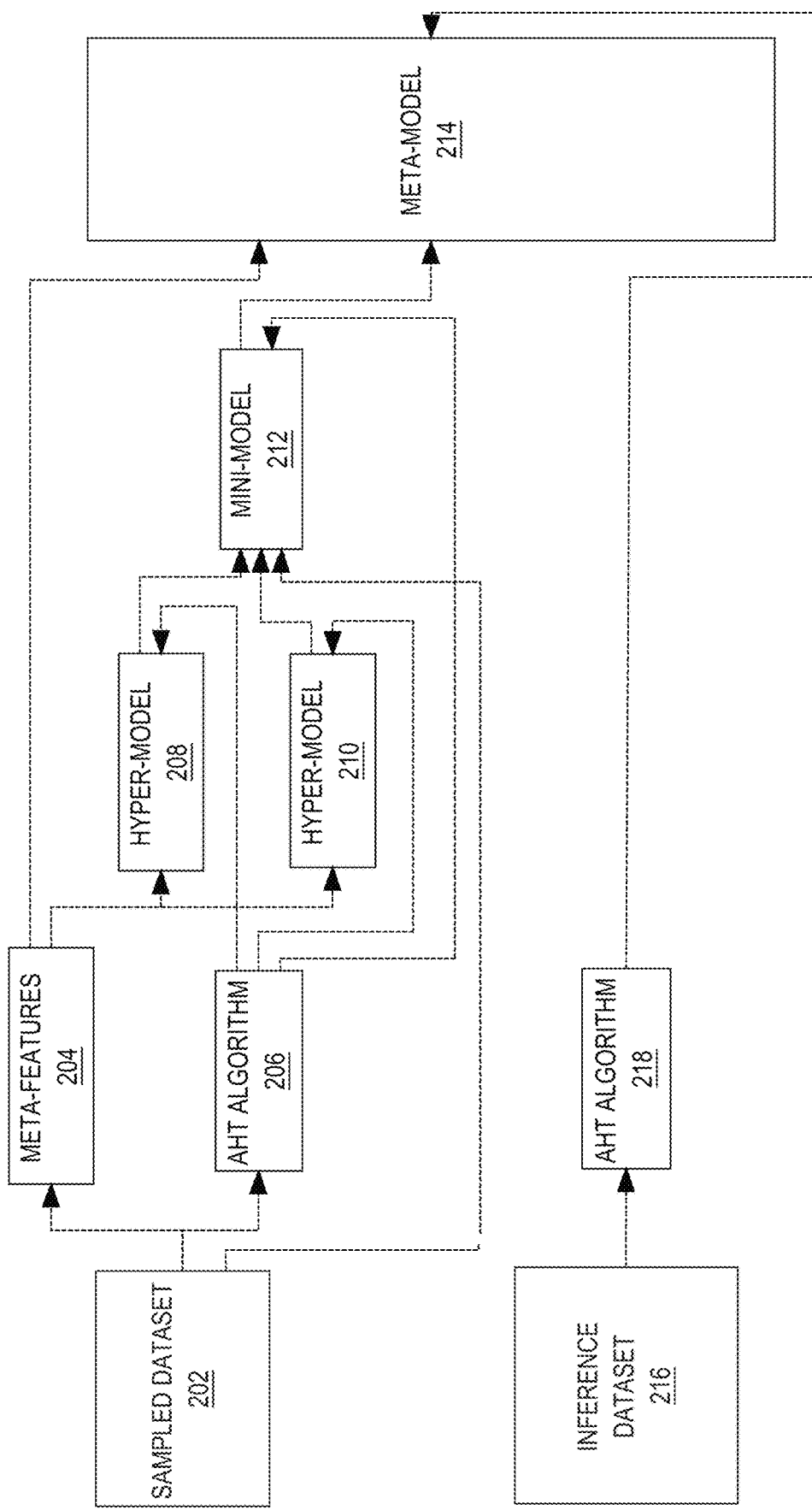
FIG. 2 is a block diagram that illustrates an automatic model selection training procedure that uses predicted hyperparameters, in an embodiment.

FIG. 2 illustrates an automatic model selection training procedure that uses predicted hyperparameters. FIG. 2 is discussed with reference to FIG. 1. The discussion below includes details of how components such as hyperparameter predictor, mini-model, and RML predictor of FIG. 1 are trained.

A two-level approach is utilized to train an automatic model selection model. In the first level, according to an embodiment, random forest (RF) models are trained that predict mini-model hyperparameters per dataset. In the second level, meta-features from the dataset as well as the mini-model scores obtained from the first level are used to train regressors that infer performance on reference-models.

Before the models are trained, dataset 216 is sampled to generate sampled dataset 202. Meta-features 204 are generated from the sampled dataset 202. Meta-features 204 may include simple and statistical meta-features such as n samples, skew and label entropy from randomly sampled subsets of each of the sampled dataset. Meta-features 204 may include meta-features as discussed with respect to FIG. 1.

AHT algorithms are used to generate an optimal set of mini-model hyperparameters for the sampled dataset 202. AHT algorithms rely on multiple offline training sessions being invoked for different hyperparameter combinations, with the hyperparameter ranges usually being provided to the algorithm by a user. Upon conclusion of the offline training sessions, an AHT algorithm outputs a set of optimal hyperparameters that produce the best score for the input dataset and a tuned score. For a given dataset, an AHT algorithm produces optimal hyperparameters and a tuned score as output. The optimal hyperparameters and tuned score are used to train components of the automatic model selection model, as described below.

In the first level of training, hyper-models 208, 210 are trained for each optimal hyperparameter generated by the AHT algorithm 206 using meta-features 204 as input and the respective optimal hyperparameter produced by the AHT algorithm 206 as the target. For categorical hyperparameters, training a hyper-model comprises training a RF classifier. For discrete and/or continuous hyperparameters, training a hyper-model comprises training a RF regressor. Upon conclusion of training, there is one RF predictor for each mini-model hyperparameter. When the hyper-models are trained, they are used to produce predicted hyperparameters which are then used as input to train the mini-model.

The mini-model 212 is trained using the sampled dataset 202 and predicted hyperparameters as produced by hyper-models 208, 210 as input and the tuned score produced by the AHT algorithm 206 as the target. Once trained, the mini-model 212 produces a mini-model score which closely tracks a RML model score for the respective mini-model. The produced mini-model score is then included as a meta-feature to train the RML predictor 214 in the second level of training.

In the second level of training, the RML predictor 214 is trained using as training input meta-features 204 from the sampled dataset and the mini-model score produced by the mini-model 212 as input and a tuned score as the target. The tuned score is obtained by running an AHT algorithm 218 on the dataset 216.

Inference Path

During inference, a dataset is randomly sampled and the base meta-features are extracted. The meta-features are then used to predict hyperparameters of the mini-models. The mini-model scores along with the base meta-features are used by the per-algorithm regressors to predict reference-model scores. The machine learning algorithms are then ranked based on their scores.

For example, as shown in FIG. 1, meta-features 131-133 and corresponding values 171-173 are generated based on the sampled dataset 110. The values of the meta-features are input to the hyperparameter predictors 135 which produce hyperparameters as output. The hyperparameters are used an input to the mini-model along with the sampled dataset 110 and/or values of the meta-features. The mini-model 140 produces a score as output and the score is used along with the meta-feature values as input to the RML predictor 145. The RML predictor 145 produces a score. The score is input to a ranking algorithm and the score of machine learning algorithm 121 is ranked alongside scores of other machine learning algorithms 122, 123.

Example Automatic Model Selection Procedure

Figure 3:
FIG. 3 is a flow diagram that depicts an example process for optimally selecting trainable algorithms based on performance predictions by using hyperparameter predictors, in an embodiment.

FIG. 3 is a flow diagram that depicts computer 100 optimally selecting trainable algorithms based on performance predictions by using hyperparameter predictors, in an embodiment. FIG. 3 is discussed with reference to FIG. 1 and also FIG. 2.

Steps 302-304 are preparatory. In step 302, a first plurality of data set samples are generated from a first data set. For example, sampled data set 110 may be generated from an data set.

In step 304, a first plurality of first meta-feature sets are generated. Each first meta-feature set describes a respective first data set sample of said first plurality of data set samples. For example, meta-features 131-134 may be predefined by human experts as aspects that are generally obtainable from many or all datasets of some application. Meta-feature values 171-174 may be extracted or synthesized from sampled dataset 110.

Steps 306, 308, 310, and 312 are repeated for each for each mini-machine learning model (MML model) of a plurality of MML models that are available to computer 100. Each mini-model is associated with an algorithm, such as algorithms 121, 122, 123. Thus, steps 306, 308, 310, and 312 are repeated for each trainable algorithm that is available to computer 100. Additionally, each MML model of the plurality of MML models represents a respective reference machine learning model (RML model) of a plurality of RML models.

In step 306, a respective target set of hyperparameter settings is generated. A respective target set of hyperparameter settings is generated for each MML model using a hypertuning algorithm. For example, as discussed with respect to FIG. 2, AHT algorithms may be used to generate target sets of hyperparameters settings. In this example, an AHT algorithm such as AHT algorithm 206 receives the first plurality of data set samples from the sampled dataset 202 and produces a respective target set of hyperparameter settings.

In step 308, a respective hyperparameter predictor set is trained that predicts a respective set of hyperparameter settings for the first data set. The hyperparameter predictor set may comprise one or more hyperparameter models. Each hyperparameter model in the hyperparameter predictor set is trained using the first plurality of first meta-feature sets, generated in step 304, and respective target set of hyperparameter settings, generated in step 306. For example, in context of FIG. 2, hyperparameter predictors 208, 210 are trained using meta-features 204 as input and hyperparameter outputs of the AHT algorithm 206 as targets.

In step 310, the respective MML model is trained that predicts a mini-model score. A MML model is trained using the respective set of hyperparameter settings for the first data set generated in step 308, the first plurality of data set samples generated in step 302. For example, in context of FIG. 2, mini-model 212 is trained using the hyperparameters settings from hyper-models 208, 210 as input, the sampled dataset 202 as input.

In step 312, a respective reference RML, predictor of said MML model is trained that predicts a respective RML predictor score. A reference RML predictor is trained using meta-features generated from samples of the data set generated in step 304, mini-model scores of said MML model such as generated in step 310, and a tuned score generated by applying the AHT to the data set. For example, in context of FIG. 2, RML predictor 214 is trained using meta-features 204 as input, a score output but trained mini-model 212 as input, and a tuned scored output by AHT algorithm 218 as a target.

In step 314, for each MML model, a respective RML predictor score is calculated by invoking the respective reference RML predictor. The respective RML predictor score is based on a respective subset of meta-feature values and respective mini-model score.

For example, already-trained RML predictor 145 may be individually stimulated with a respective subset of meta-feature values 171-173 and mini-model 140 scores as inference inputs. For example, RML predictor 145 calculates score 160 based on meta-feature values 171-172 and a score output by mini-model 140.

After the steps above are repeated for each machine learning algorithm, all machine learning algorithms 121-123 have scores. Each machine learning algorithm is ranked based on the scores. In an embodiment, the machine learning algorithm corresponding to the RML predictor with the highest score is selected as the optimal machine learning algorithm for the data set. For example, computer 100 selects machine learning algorithm 122 that has the highest scoring RML predictor of all machine learning algorithms.

Step 312 may finish by invoking the RML corresponding to the algorithm with the highest score to obtain a result. For example, the result may be a classification/recognition of an object within an dataset 110 or a larger dataset.

Technical Benefits

The techniques herein improve the performance of computer 100 itself in various ways. By pruning the hyperparameter hyperspace, training of an excessive count of hyperparameter configurations is avoided. By selecting well suited machine learning algorithms and/or their configurations, training of an excessive count of different machine learning algorithms is avoided. By scoring based on fitness for actual dataset meta-feature values, contextual suitability of selection is increased.

Additionally, using predicted hyperparameters for a mini-model improves the accuracy of scores of each mini-model such that the score of a mini-model using predicted hyperparameters much more closely resembles the reference model score per dataset. The improved scores are used to more accurately rank and select the best machine learning algorithm for the given dataset.

Figure 4:
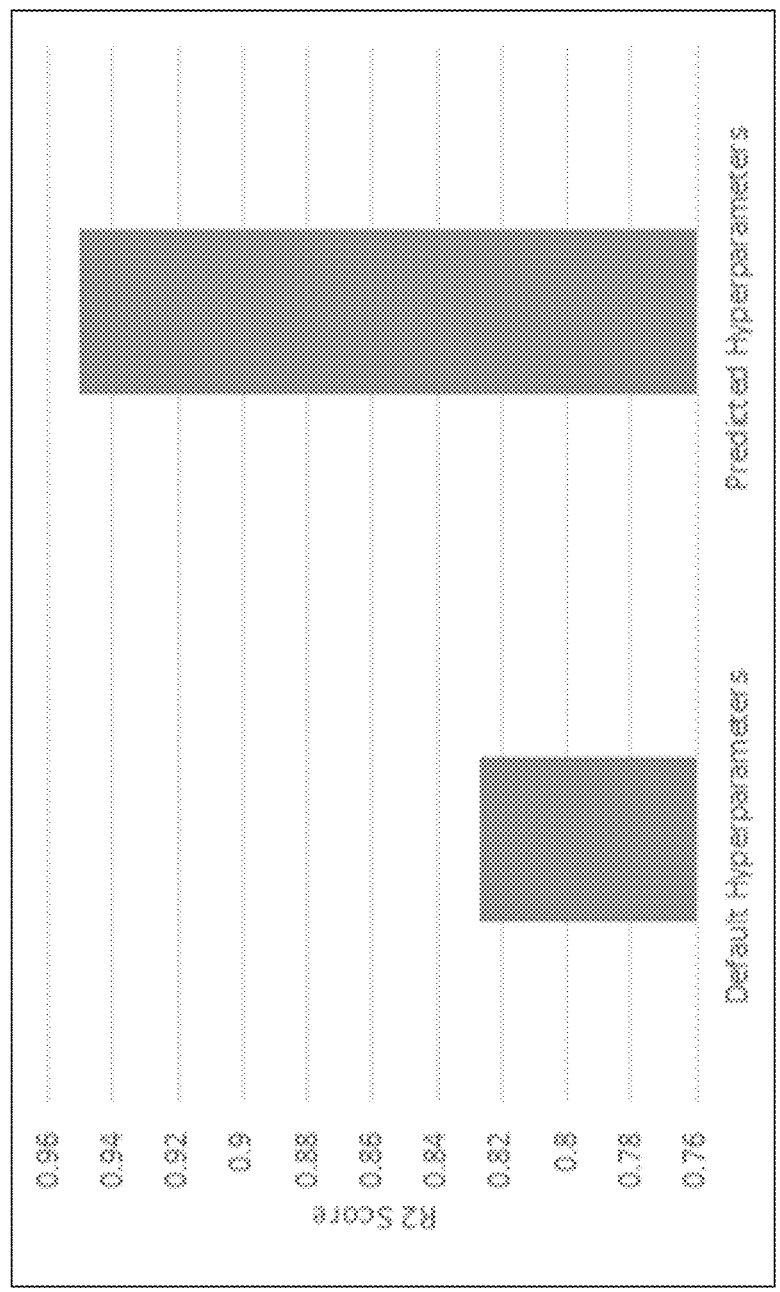
FIG. 4 is a bar graph that illustrates a measured improvement in the R2 score of a regressor using predicted hyperparameters, in an embodiment.

FIG. 4 illustrates a measured improvement in the R2 score of a regressor using predicted hyperparameters. Specifically, FIG. 4 shows the improvement in the R2 score of a regressor that predicts the score of a Logistic Regression Classifier on ~150 OpenML classification datasets. When using a mini-model that scores each dataset using default hyperparameters, the R2 score of the resulting regressor is ~0.82. However, when a two level training approach is used, such as the approaches discussed herein, where first the logistic regression mini-model hyperparameters are predicted per-dataset, and the resulting score is used to train the level two regressor, an R2 score of ~0.95 is obtained.

Thus, subsequent training (e.g. by computer 100) occurs faster. Likewise, the trained selected machine learning algorithm(s) achieve higher accuracy in production use (e.g. by computer 100). Thus, computer 100 is accelerated as a machine learning algorithm training computer and is more reliable (accurate) as a production inference computer. By reducing the computational burden of these activities, the techniques herein are accelerated (save time) and save energy.

Machine Learning Models

A machine learning model is trained using a particular machine learning algorithm. Once trained, input is applied to the machine learning model to make a prediction, which may also be referred to herein as a predicted output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e., simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programming languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., amount of layers) may cause computational latency. Deep learning entails endowing a multilayer perceptron (MLP) with many layers. Each layer achieves data abstraction, with complicated (i.e., multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake a I as an L because those letters have similar features. Correct output may have particular value(s), while actual output may have somewhat different values. The arithmetic or geometric difference between correct and actual outputs may be measured as error according to a loss function, such that zero represents error free (i.e., completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptrons (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e., correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e., surrounding/related details) into a same (e.g. densely) encoded unit that may be applied to an ANN for analysis. One form of contextual encoding is graph embedding, which constructs and prunes (i.e., limits the extent of) a logical graph of (e.g.

temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 5:
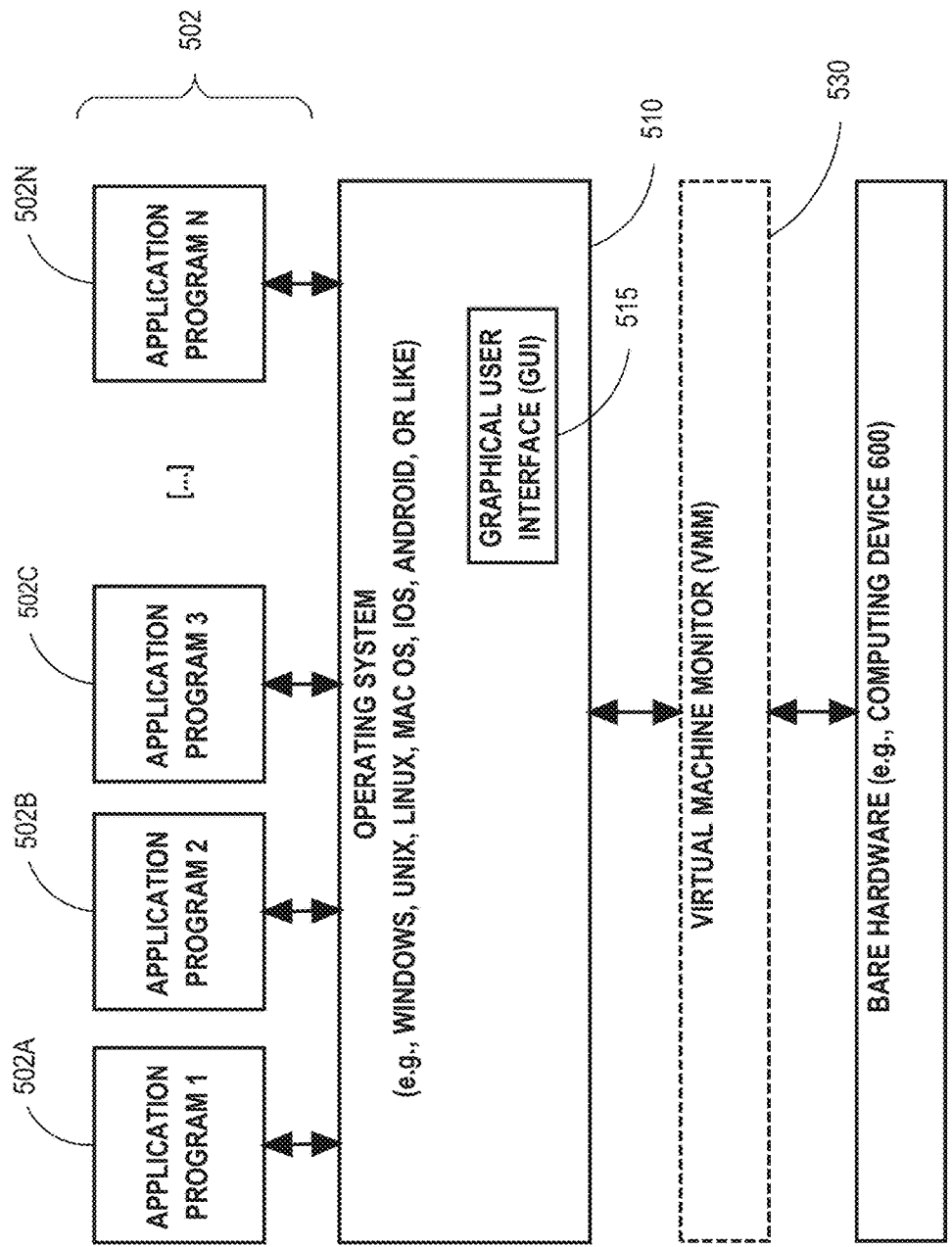
FIG. 5 is a block diagram that illustrates a basic software system that may be employed for controlling the operation of a computing system.

FIG. 5 is a block diagram of a basic software system 500 that may be employed for controlling the operation of computing system 600. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 700. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 505) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
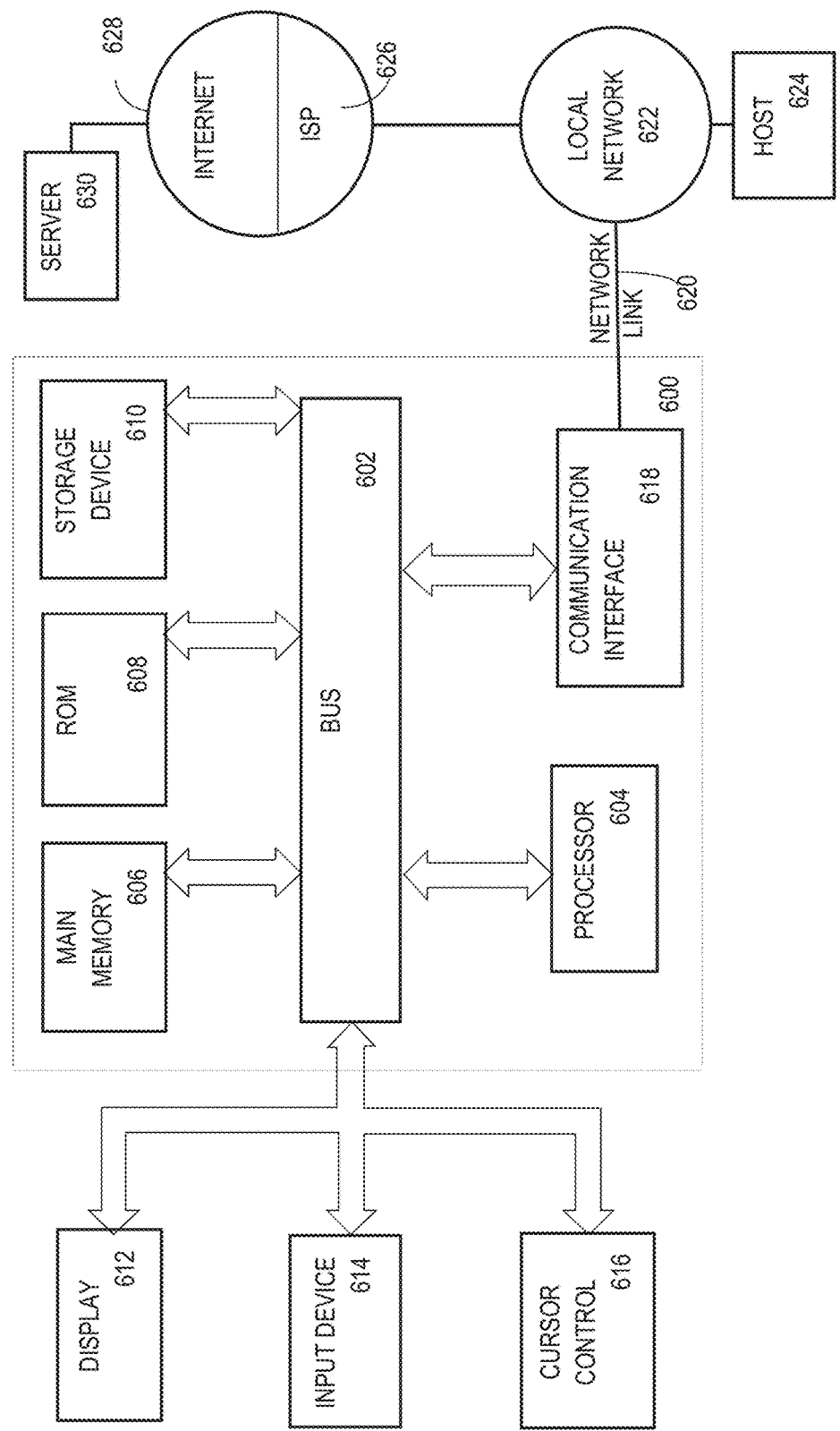
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. A method comprising:
for each mini-machine learning model (MML model) of a plurality of MML models, training a respective hyperparameter predictor set that predicts a respective set of predicted hyperparameter settings, wherein said each MML model represents a respective reference machine learning algorithm (RML), wherein training said respective hyperparameter predictor set for said each MML model comprises:
generating first training data used to train said respective hyperparameter predictor set, wherein generating first training data comprises:
generating a first plurality of data set samples from a first data set;
generating a first plurality of first meta-feature sets, each first meta-feature set of said first plurality of first meta-feature sets describing a respective first data set sample of said first plurality of data set samples;

generating for said each MML model using a hypertuning algorithm: a respective target set of hyperparameter settings and a respective tuned score;

training each MML model of the plurality of MML models thereby generating a respective trained version of said each MML model of a plurality of trained MML models and respective scores; and training a respective reference RML predictor of said each trained MML model of said plurality of trained MML models by:

using as training input the respective scores of said each trained MML model, and using as a target, the tuned score that was generated by said hypertuning algorithm on said first data set.

2. The method of claim 1, wherein training said respective hyperparameter predictor set comprises: using the first plurality of first meta-feature sets and the respective target set of hyperparameter settings to train said respective hyperparameter predictor set.

3. The method of claim 1, wherein said generating the respective trained version of said each MML model of the plurality of trained MML models and respective scores comprises:

generating a second plurality of data set samples from said first data set;

generating a second plurality of second meta-feature sets, each second meta-feature set of said second plurality of second meta-feature sets describing a respective second data set sample of said second plurality of data set samples;

generating respective predicted hyperparameter settings by applying the respective hyperparameter predictor set of said each trained MML model to said second plurality of second meta-feature sets.

4. The method of claim 3, wherein said training input comprises said second plurality of second meta-feature sets.

5. The method of claim 1, wherein training a respective reference RML predictor of said each trained MML model generates a respective trained RML predictor of a plurality of trained RML predictors.

6. The method of claim 5, further comprising:

generating a second plurality of data set samples from said first data set;

generating a second plurality of second meta-feature sets, each second meta-feature set describing a respective second data set sample of said second plurality of data set samples;

generating a plurality of RML predictor scores for each respective trained RML predictor of said each trained MML model of said plurality of trained MML models by, for each second data set sample, generating a RML predictor score using:

the respective score of said each trained MML model and said respective second meta-feature set.

7. The method of claim 6, further comprising:

selecting, based on the plurality of RML predictor scores, one or more machine learning algorithms of a plurality of machine learning algorithms, wherein each machine learning algorithm is associated with a MML model of the plurality of MML models;

invoking, based on the first data set, the respective RML model to obtain a result.

8. The method of claim 7, wherein selecting the one or more machine learning algorithms comprises ranking the plurality of machine learning algorithms based on the plurality of RML predictor scores.

9. The method of claim 7, wherein each machine learning algorithm of the plurality of machine learning algorithms comprises at least one of: a support vector machine (SVM), a random forest, a decision tree, or an artificial neural network.

10. The method of claim 7, wherein each machine learning algorithm of the plurality of machine learning algorithms comprises one of: classification, regression, or anomaly detection.

11. A non-transitory computer-readable storage medium storing sequences of instructions that, when executed by one or more processors, cause:

for each mini-machine learning model (MML model) of a plurality of MML models, training a respective hyperparameter predictor set that predicts a respective set of predicted hyperparameter settings, wherein said each MML model represents a respective reference machine learning algorithm (RML), wherein training said respective hyperparameter predictor set for said each MML model comprises:

generating first training data used to train said respective hyperparameter predictor set, wherein generating first training data comprises:

generating a first plurality of data set samples from a first data set;

generating a first plurality of first meta-feature sets, each first meta-feature set of said first plurality of first meta-feature sets describing a respective first data set sample of said first plurality of data set samples;

generating for said each MML model using a hypertuning algorithm: a respective target set of hyperparameter settings and a respective tuned score;

training each MML model of the plurality of MML models thereby generating a respective trained version of said each MML model of a plurality of trained MML models and respective scores; and training a respective reference RML predictor of said each trained MML model of said plurality of trained MML models by:

using as training input the respective scores of said each trained MML model, and using as a target, the tuned score that was generated by said hypertuning algorithm on said first data set.

12. The non-transitory computer-readable storage medium of claim 11, wherein training said respective hyperparameter predictor set comprises: using the first plurality of first meta-feature sets and the respective target set of hyperparameter settings to train said respective hyperparameter predictor set.

13. The non-transitory computer-readable storage medium of claim 11, wherein said generating the respective trained version of said each MML model of the plurality of trained MML models and respective scores comprises:

generating a second plurality of data set samples from said first data set;

generating a second plurality of second meta-feature sets, each second meta-feature set of said second plurality of second meta-feature sets describing a respective second data set sample of said second plurality of data set samples;

generating respective predicted hyperparameter settings by applying the respective hyperparameter predictor set of said each trained MML model to said second plurality of second meta-feature sets.

14. The non-transitory computer-readable storage medium of claim 13, wherein said training input comprises said second plurality of second meta-feature sets.

15. The non-transitory computer-readable storage medium of claim 11, wherein training a respective reference RML predictor of said each trained MML model generates a respective trained RML predictor of a plurality of trained RML predictors.

16. The non-transitory computer-readable storage medium of claim 15, the sequences of instructions including instructions that, when executed by said one or more processors, cause:
   generating a second plurality of data set samples from said first data set;
   generating a second plurality of second meta-feature sets, each second meta-feature set describing a respective second data set sample of said second plurality of data set samples;
   generating a plurality of RML predictor scores for each respective trained RML predictor of said each trained MML model of said plurality of trained MML models by, for each second data set sample, generating a RML predictor score using:
      the respective score of said each trained MML model and said respective second meta-feature set.

17. The non-transitory computer-readable storage medium of claim 16, the sequences of instructions including instructions that, when executed by said one or more processors, cause:
   selecting, based on the plurality of RML predictor scores, one or more machine learning algorithms of a plurality of machine learning algorithms, wherein each machine learning algorithm is associated with a MML model of the plurality of MML models;
   invoking, based on the first data set, the respective RML model to obtain a result.

18. The non-transitory computer-readable storage medium of claim 17, wherein selecting the one or more machine learning algorithms comprises ranking the plurality of machine learning algorithms based on the plurality of RML predictor scores.

19. The non-transitory computer-readable storage medium of claim 17, wherein each machine learning algorithm of the plurality of machine learning algorithms comprises at least one of: a support vector machine (SVM), a random forest, a decision tree, or an artificial neural network.

20. The non-transitory computer-readable storage medium of claim 17, wherein each machine learning algorithm of the plurality of machine learning algorithms comprises one of: classification, regression, or anomaly detection.

* * * * *